United States Patent
Muto

(10) Patent No.: US 9,332,600 B2
(45) Date of Patent: May 3, 2016

(54) DRIVING CIRCUIT FOR LIGHT EMITTING ELEMENT, AND LIGHT EMITTING DEVICE

(71) Applicant: CANON KABUSHIKI KAISHA, Tokyo (JP)

(72) Inventor: Takashi Muto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 13/647,716

(22) Filed: Oct. 9, 2012

(65) Prior Publication Data
US 2013/0127820 A1 May 23, 2013

(30) Foreign Application Priority Data
Nov. 21, 2011 (JP) .................................. 2011-254458

(51) Int. Cl.
*G09G 3/32* (2006.01)
*H05B 33/08* (2006.01)

(52) U.S. Cl.
CPC .......... *H05B 33/0806* (2013.01); *G09G 3/3233* (2013.01); *H05B 33/0803* (2013.01); *H05B 33/0896* (2013.01)

(58) Field of Classification Search
CPC ........... H05B 33/0803; H05B 33/0896; G09G 3/3233
USPC .......... 345/82; 347/246; 340/815.45; 372/29.014; 250/205
See application file for complete search history.

(56) References Cited

U.S. PATENT DOCUMENTS

| | | | |
|---|---|---|---|
| 5,136,346 A * | 8/1992 | Kornowski | 257/598 |
| 6,359,605 B1 * | 3/2002 | Knapp et al. | 345/76 |
| 6,392,617 B1 * | 5/2002 | Gleason | 345/82 |
| 6,578,161 B1 | 6/2003 | Kohtani et al. | |
| 6,693,610 B2 * | 2/2004 | Shannon et al. | 345/76 |
| 6,728,494 B2 | 4/2004 | Numata et al. | |
| 7,075,338 B2 | 7/2006 | Mizuno et al. | |
| 7,372,882 B2 | 5/2008 | Horiuchi et al. | |
| 7,453,424 B2 * | 11/2008 | Johnson et al. | 345/76 |
| 7,542,684 B2 | 6/2009 | Matsuda | |
| 7,635,833 B2 * | 12/2009 | Mansoorian | 250/208.1 |
| 7,642,724 B2 | 1/2010 | Muto et al. | |

(Continued)

FOREIGN PATENT DOCUMENTS

| | | |
|---|---|---|
| JP | H02-54977 A | 2/1990 |
| JP | H05-90642 A | 4/1993 |

(Continued)

*Primary Examiner* — Chanh Nguyen
*Assistant Examiner* — Yuzhen Shen
(74) *Attorney, Agent, or Firm* — Fitzpatrick, Cella, Harper & Scinto

(57) ABSTRACT

A driving circuit that switches a light emitting element between an ON state and an OFF state in synchronization with an input signal is provided. The circuit includes a driving current supply unit that has a control terminal and supplies the light emitting element with a driving current whose value changes with dependency on the potential of the control terminal; a control unit that changes the potential of the control terminal in synchronization with the input signal; and a supplementary current supply unit that supplies the control terminal with a supplementary current that promotes change in the potential of the control terminal. The supplementary current supply unit has a capacitor, a voltage that is applied to the capacitor changes in synchronization with the input signal, and the supplementary current is generated by change in the voltage of the capacitor.

13 Claims, 5 Drawing Sheets

(56) References Cited

U.S. PATENT DOCUMENTS

| | | | |
|---|---|---|---|
| 7,868,858 B2* | 1/2011 | Sun | 345/82 |
| 7,907,852 B2 | 3/2011 | Hase et al. | |
| 8,358,080 B2 | 1/2013 | Nakamura | |
| 2004/0079977 A1* | 4/2004 | Ying et al. | 257/292 |
| 2006/0208978 A1* | 9/2006 | Kawasaki | G09G 3/3241 345/76 |
| 2006/0261254 A1* | 11/2006 | Suzuki et al. | 250/214 R |
| 2008/0159755 A1* | 7/2008 | Hakomori | 398/202 |
| 2009/0016394 A1* | 1/2009 | Kanno | 372/38.02 |
| 2009/0284519 A1* | 11/2009 | Kim | G09G 3/3233 345/213 |

FOREIGN PATENT DOCUMENTS

| | | |
|---|---|---|
| JP | H11-74567 A | 3/1999 |
| JP | 2002-064433 A | 2/2002 |
| JP | 2003-188465 A | 7/2003 |
| JP | 2003-209319 A | 7/2003 |
| JP | 2006-128393 A | 5/2006 |
| JP | 2008-060521 A | 3/2008 |
| JP | 2008-251886 A | 10/2008 |
| JP | 2011-003939 A | 1/2011 |
| JP | 2011-159751 A | 8/2011 |

* cited by examiner

DRIVING CIRCUIT FOR LIGHT EMITTING ELEMENT, AND LIGHT EMITTING DEVICE

BACKGROUND OF THE INVENTION

1. Field of the Invention

The present invention relates to a driving circuit for a light emitting element, and a light emitting device.

2. Description of the Related Art

With light emitting devices used in laser beam printers and the like in recent years, there is demand for the ability to switch the light-emitting state, that is to say, switch between the ON state and the OFF state, at speeds of 200 Mbps or more. In order to increase the speed of switching the state of a light emitting element, Japanese Patent Laid-Open No. 2008-251886 proposes the following configuration. Two MOS transistors configure a current mirror circuit that supplies a laser diode with driving current, and the gate of the MOS transistor that is connected to the laser diode is grounded via a switch. When the state of the laser diode is to be switched, the switch is put in the conductive state, and current flows from the gate of the MOS transistor to the ground connection, thus increasing the speed of the change in the potential of the gate.

SUMMARY OF THE INVENTION

Although the speed of switching the state of a light emitting element is increased to a certain extent with the configuration of Japanese Patent Laid-Open No. 2008-251886, the increase cannot be the to be sufficient. In view of this, an aspect of the present invention provides technology for further improving the speed of switching a light emitting element between the ON state and the OFF state.

An aspect of the present invention provides a driving circuit that switches a light emitting element between an ON state and an OFF state in synchronization with an input signal, the driving circuit comprising: a driving current supply unit that has a control terminal and supplies the light emitting element with a driving current whose value changes with dependency on the potential of the control terminal; a control unit that switches the light emitting element between the ON state and the OFF state by changing the potential of the control terminal in synchronization with the input signal; and a supplementary current supply unit that supplies the control terminal with a supplementary current that promotes change in the potential of the control terminal, wherein the supplementary current supply unit has a capacitor, a voltage that is applied to the capacitor changes in synchronization with the input signal, and the supplementary current is generated by change in the voltage of the capacitor.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will be described below with reference to the accompanying drawings. The same reference signals have been given to components that are the same in multiple drawings, and redundant descriptions thereof will not be given. In the following embodiments, the present invention is described from the viewpoint of a light emitting device that is used for image formation in a laser beam printer or the like. However, the present invention may be used in any application as long as it is applied to a driving circuit for switching a light emitting element between the ON state and the OFF state.

Figure 1:
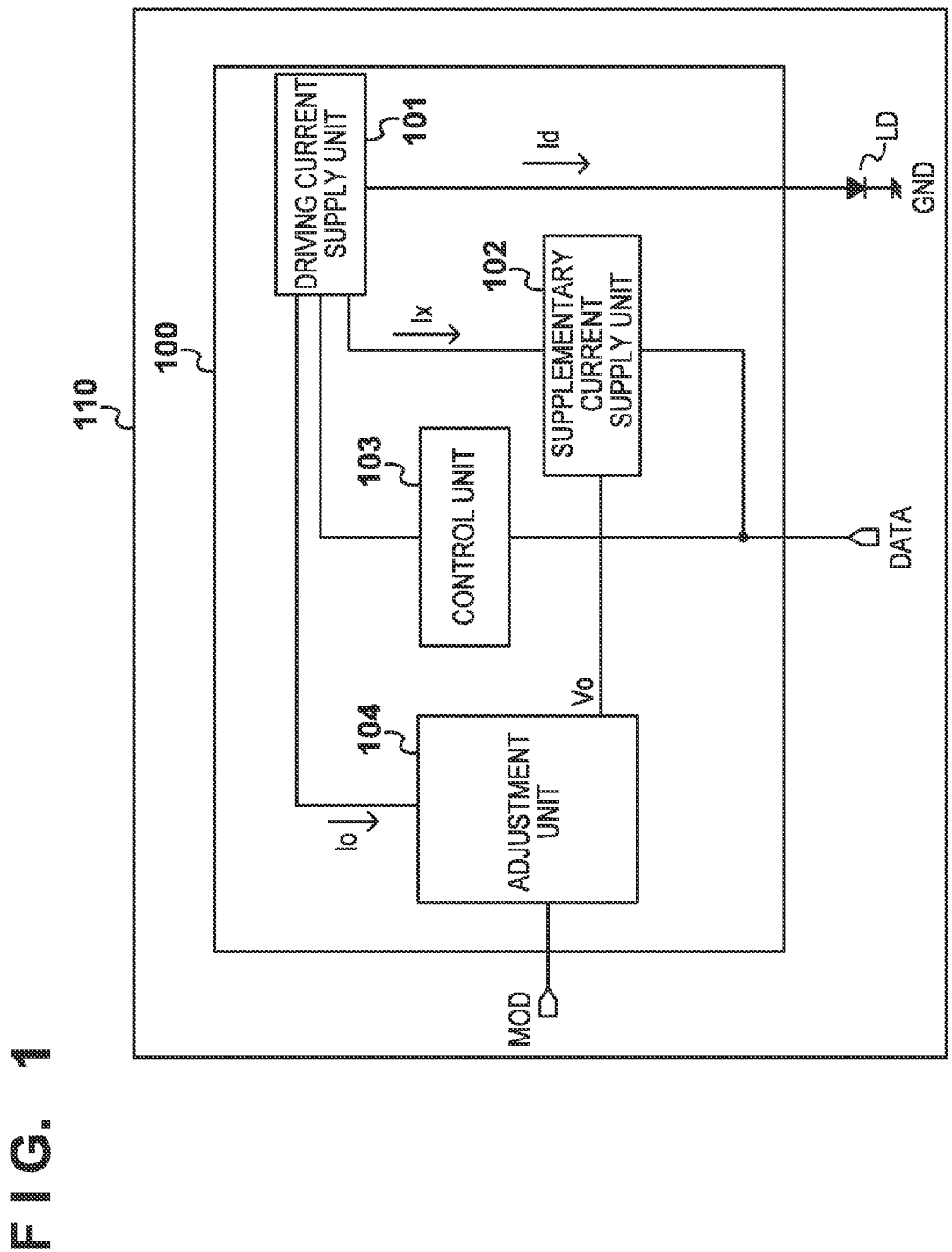
FIG. 1 is a diagram showing an example of the functional configuration of a light emitting device according to embodiments of the present invention.

The following describes an example of the functional configuration of a light emitting device according to one embodiment of the present invention with reference to FIG. 1. A light emitting device 110 can include a light emitting element and a driving circuit 100. Although a cathode stem type of laser diode LD is used as an example of the light emitting element in the following embodiments, any light emitting element can be used as long as it is put in the ON state upon being driven with current. The cathode of the laser diode LD is connected to a ground GND, and the anode is connected to the driving circuit 100. The driving circuit 100 drives the laser diode LD and switches the laser diode LD between the ON state and the OFF state. In the present embodiment, the laser diode LD is in the ON state while the driving circuit 100 supplies the light emitting element LD with a driving current Id whose value is greater than or equal to a predetermined value, and the laser diode LD is in the OFF state when the value of the driving current Id is less than the predetermined value. If the value of the driving current Id is zero, current is not supplied to the laser diode LD.

The driving circuit 100 can include a driving current supply unit 101, a supplementary current supply unit 102, a control unit 103, and an adjustment unit 104. The driving current supply unit 101 supplies the laser diode LD with the driving current Id. The control unit 103 changes the value of the driving current Id supplied to the laser diode LD by the driving current supply unit 101 in synchronization with an input signal DATA. For example, the control unit 103 can control the value of the driving current Id supplied by the driving current supply unit 101 by changing the potential of the control terminal of the driving current supply unit 101, and thus can switch the laser diode LD between the ON state and the OFF state. The present embodiment describes the case where the input signal DATA is a pulse signal that can take the two values of high level (referred to hereinafter as "H") and low level (referred to hereinafter as "L"). If the light emitting device 110 is used in a copying machine, a laser beam printer, or the like, the input signal DATA can be the binary pixel values of image data that is to be printed.

The supplementary current supply unit 102 supplies the driving current supply unit 101 with a supplementary current Ix. The supplementary current is a current for increasing the speed of switching the laser diode LD between the ON state and the OFF state, and will be described in detail later. The adjustment unit 104 adjusts the light emission amount of laser light from the laser diode LD and adjusts the value of the driving current Id.

Figure 2:
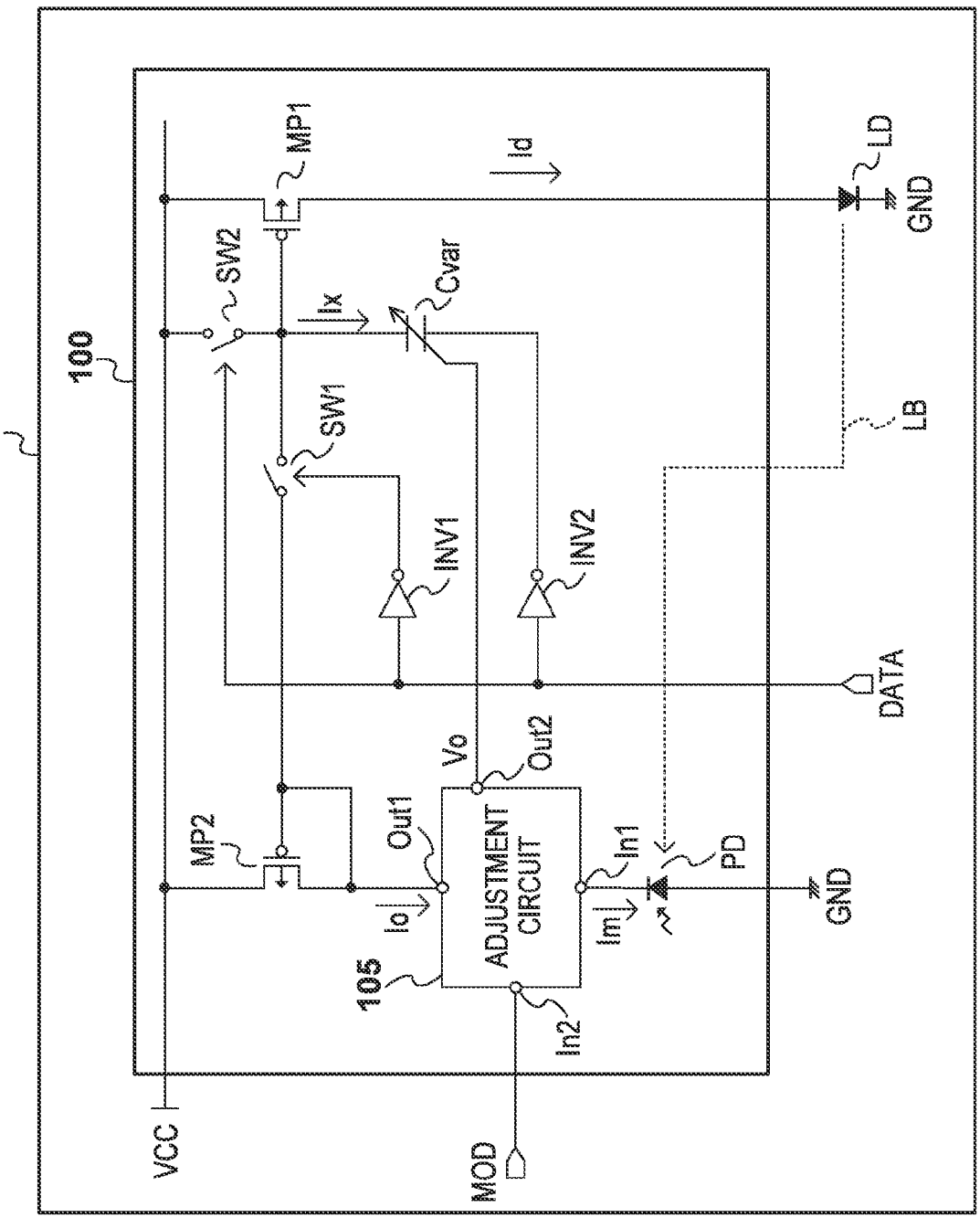
FIG. 2 is a diagram showing an example of the circuit configuration of the light emitting device according to an embodiment of the present invention.

Next, an example of a specific circuit configuration for realizing the functional configuration of the driving circuit 100 shown in FIG. 1 will be described with reference to FIG. 2. The driving current supply unit 101 can have a MOS transistor MP1 (first MOS transistor) and a MOS transistor MP2 (second MOS transistor). The supplementary current supply unit 102 can have a variable capacitor Cvar and an inverter INV2. The control unit 103 can have two switches SW1 and SW2 and an inverter INV1. The adjustment unit 104 can have an adjustment circuit 105 and a photoelectric conversion element such as a photodiode PD.

The source of the MOS transistor MP1 is connected to a power-supply voltage VCC, the drain is connected to the anode of the laser diode LD, and the gate is connected to the switch SW1. The source of the MOS transistor MP2 is connected to the power-supply voltage VCC, the drain is connected to an output terminal Out1 of the adjustment circuit 105, and the gate is connected to the switch SW1. In other words, the gate of the MOS transistor MP1 and the gate of the MOS transistor MP2 are connected via the switch SW1. Also, the gate of the MOS transistor MP1 and the power-supply voltage VCC are connected via the switch SW2. Furthermore, the gate and the drain of the MOS transistor MP2 are shunted. Although not shown, the back gate of the MOS transistor MP1 and the back gate of the MOS transistor MP2 are both connected to the power-supply voltage VCC.

The input signal DATA is supplied via the inverter INV1 as a control signal for controlling the switching of the switch SW1. The input signal DATA is also supplied as a control signal for controlling the switching of the switch SW2. One of the electrodes of the variable capacitor Cvar (the upper electrode in FIG. 2) is connected to the gate of the MOS transistor MP1, and the input signal DATA is applied to the other electrode (the lower electrode in FIG. 2) via the inverter INV2. The capacitance value of the variable capacitor Cvar can be changed, and is adjusted by a voltage Vo that is applied thereto from an output terminal Out2 of the adjustment circuit 105. In the present embodiment, it is assumed that the capacitance value of the variable capacitor Cvar increases as the value of the voltage Vo applied thereto increases.

The cathode of the photodiode PD is connected to an input terminal In1 of the adjustment circuit 105, and the anode is connected to the ground GND. The photodiode PD is disposed at a position at which it can receive a laser beam LB emitted by the laser diode LD, and the photodiode PD generates a monitor current Im that corresponds to the light emission amount of the laser beam LB from the laser diode LD, and supplies the monitor current Im to the input terminal In1 of the adjustment circuit 105.

The adjustment circuit 105 outputs a current Io from the output terminal Out1, and outputs the voltage Vo from the output terminal Out2. The adjustment circuit 105 adjusts the value of the voltage Vo so as to be positively correlated with the value of the current Io. In other words, the adjustment circuit 105 increases the value of the voltage Vo as the value of the current Io increases. A mode selection signal MOD is input to the input terminal In2 of the adjustment circuit 105, and the adjustment circuit 105 switches its operating state in accordance with the mode selection signal MOD. Details of the operations performed by the adjustment circuit 105 in each of the modes will be described later.

Figure 3:
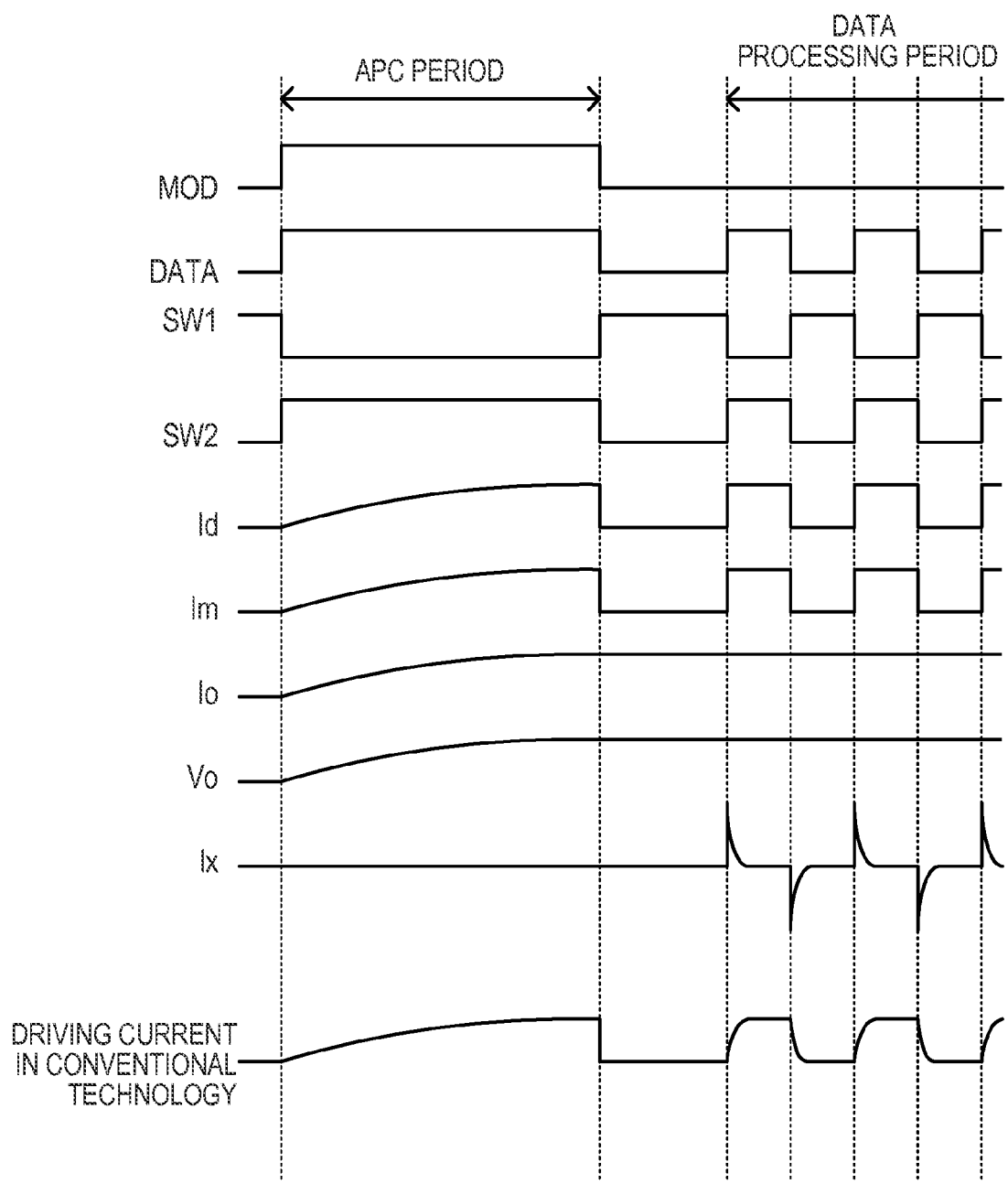
FIG. 3 is a timing chart illustrating an example of operations performed by the light emitting device according to an embodiment of the present invention.

Next, an example of operations performed by the light emitting device 110 shown in FIG. 2 will be described with reference to the timing chart in FIG. 3. The light emitting device 110 of the present embodiment can operate in two modes, namely an auto power control (APC) mode and a data processing mode. The APC mode is a mode in which the driving circuit 100 adjusts the value of the driving current Id in order to cause the laser diode LD to emit a necessary amount of light. The data processing mode is a mode in which the driving circuit 100 switches the laser diode LD between the ON state and the OFF state in synchronization with the input signal DATA. In the present embodiment, it is assumed that the light emitting device 110 is in the APC mode when the mode selection signal MOD is at H, and the light emitting device 110 is in the data processing mode when the mode selection signal MOD is at L. If the user of the light emitting device 110 periodically switches the light emitting device 110 to the APC mode, it is possible to adjust change in the current-light conversion characteristics that occurs due to aging degradation of the laser diode LD and the like.

First, operations performed in the period when the light emitting device 110 is in the APC mode (referred to hereinafter as the "APC period") will be described. As previously mentioned, the mode selection signal MOD is kept at H in the APC period. Also, the driving circuit 100 keeps the input signal DATA at H in the APC period. As a result, the control signal for the switch SW1 is at L, and the switch SW1 is in the conductive state. On the other hand, the control signal for the switch SW2 is at H, and the switch SW2 is in the non-conductive state. Accordingly, the MOS transistor MP1 and the MOS transistor MP2 form a current mirror circuit. This current mirror circuit amplifies the current Io supplied from the adjustment circuit 105 by a predetermined ratio, and supplies the amplified current to the laser diode LD via the MOS transistor MP1 as the driving current Id.

When the APC period starts, the adjustment circuit 105 gradually increases the value of the current Io that is supplied to the MOS transistor MP2. Accordingly, the value of the driving current Id that is supplied to the laser diode LD also gradually increases. The laser diode LD emits a laser beam LB having a light emission amount that corresponds to the value of the driving current Id. The photodiode PD receives this laser beam LB and supplies the adjustment circuit 105 with a current Im that corresponds to the light emission amount. The value of the current Im also gradually increases with dependency on the current Io. The adjustment circuit 105 measures the light emission amount based on the value of the current Im, stores the value of the current Io at the point in time when the value of the current Im reached a predetermined value, and continues to output the current Io with that value even after the end of the APC period. The adjustment circuit 105 also outputs, from the output terminal Out2, the voltage Vo having a value that is positively correlated with the value of the current Io. For example, the value of the voltage Vo may be proportional to the value of the current Io.

Next is a description of operations performed in the period when the light emitting device 110 is in the data processing mode (referred to hereinafter as the "data processing period"). As previously mentioned, the mode selection signal MOD is kept at L in the data processing period. Also, the input signal DATA is input to the driving circuit 100 in the data processing period. In the present embodiment, the driving circuit 100 switches the laser diode LD to the ON state if the input signal DATA is at H, and switches the laser diode LD to the OFF state if the input signal DATA is at L.

First, operations performed by the light emitting device 110 when the input signal DATA has changed from L to H will be described. When the input signal DATA changes from L to H, the switch SW1 enters the conductive state, and the switch SW2 enters to the non-conductive state, similarly to the description given above. Accordingly, the gate of the MOS transistor MP1 and the gate of the MOS transistor MP2 are connected, and the gate and the source of the MOS transistor MP1 are disconnected. As a result, the MOS transistor MP1 and the MOS transistor MP2 form a current mirror circuit. When the current mirror circuit is formed, the value of the gate potential of the MOS transistor MP1 changes, and the value of the driving current Id, which is supplied from the MOS transistor MP1 to the laser diode LD, changes in accordance with this change. In other words, the gate of the MOS transistor MP1 functions as the control terminal of the driving current supply unit 101.

Also, when the input signal DATA changes from L to H, the voltage that is applied to one of the electrodes of the variable capacitor (the lower electrode in FIG. 2) changes from H to L. Assuming that the voltage of the variable capacitor Cvar at this time is Vx, a supplementary current Ix having a value obtained by multiplying the temporal differentiation of the voltage Vx by a capacitance value C of the variable capacitor is generated and supplied to the gate of the MOS transistor MP1. In other words, a supplementary current Ix that satisfies Ix=C×(dVx/dt) is generated in accordance with the change in the voltage of the variable capacitor and supplied to the gate of the MOS transistor MP1.

Immediately after the change in the input signal DATA from L to H, the potential of the gate of the MOS transistor MP1 is the same as the power-supply voltage VCC, and when this potential decreases to a predetermined value, the value of the driving current Id surpasses a predetermined value, and the laser diode LD enters the ON state. The supplementary current Ix supplied to the gate of the MOS transistor MP1 flows in a direction of reducing the potential of the gate, thus promoting a change in the gate potential. Furthermore, since the supplementary current Ix is dependent on the temporal differentiation of the voltage Vx, the supplementary current Ix takes a very high value immediately after the change in the input signal DATA from L to H and then falls to zero, as shown by the waveform in FIG. 3. For this reason, compared to the driving current in conventional technology shown in FIG. 3, the rising edge of the driving current Id for the laser diode LD is steeper, and the rise time is shortened. Here, the rise time refers to the time from when the input signal DATA changes from L to H until when the laser diode LD changes to the ON state. When the potential of the gate of the MOS transistor MP1 becomes the same as the potential of the gate of the MOS transistor MP2, the driving current Id having a value that is proportional to the value of the current Io output from the adjustment circuit 105 continues to be supplied to the laser diode LD, and the laser diode LD is kept in the ON state.

Next, operations performed by the light emitting device 110 when the input signal DATA has changed from H to L will be described. When the input signal DATA changes from H to L, the switch SW1 enters the non-conductive state, and the switch SW2 enters the conductive state. Accordingly, the gate of the MOS transistor MP1 and the gate of the MOS transistor MP2 are disconnected, and the gate and the source of the MOS transistor MP1 are connected. As a result, a current mirror circuit is no longer formed by the MOS transistor MP1 and the MOS transistor MP2.

Also, when the input signal DATA changes from H to L, the voltage that is applied to one of the electrodes of the variable capacitor (the lower electrode in FIG. 2) changes from L to H. In this case as well, similarly to the description given above, a supplementary current Ix that satisfies Ix=C×(dVx/dt) is generated and supplied to the gate of the MOS transistor MP1.

Immediately after the change in the input signal DATA from H to L, the potential of the gate of the MOS transistor MP1 is the same as the potential of the gate of the MOS transistor MP2, and when this potential is increased to a predetermined value, the value of the driving current Id falls below a predetermined value, and the laser diode LD enters the OFF state. The supplementary current Ix supplied to the gate of the MOS transistor MP1 flows in a direction 2 of raising the potential of the gate, thus promoting a change in the gate potential. Furthermore, since the supplementary current Ix is dependent on the temporal differentiation of the voltage Vx, the supplementary current Ix takes a very high value immediately after the change in the input signal DATA from H to L and then falls to zero, as shown by the waveform in FIG. 3. For this reason, compared to the driving current in conventional technology shown in FIG. 3, the falling edge of the driving current Id for the laser diode LD is steeper, and the fall time is shortened. Here, the fall time refers to the time from when the input signal DATA changes from H to L until when the laser diode LD changes to the OFF state. When the potential of the gate of the MOS transistor MP1 becomes the same as the power-supply voltage VCC, the value of driving current Id is zero, and the laser diode LD is kept in the OFF state.

In the present embodiment, the adjustment circuit 105 adjusts the capacitance value of the variable capacitor Cvar so as to be positively correlated with the value of the current Io. Since the value of the driving current Id is proportional to the value of the current Io, and the value of the supplementary current Ix is proportional to the capacitance value of the variable capacitor Cvar, it can be said that the supplementary current Ix is positively correlated with the driving current Id. In other words, with the driving circuit 100 of the present embodiment, the value of the supplementary current Ix also increases as the value of the driving current Id increases. In this way, by adjusting the magnitude of the supplementary current Ix with dependency on the magnitude of the driving current Id, it is possible to prevent overshooting of the pulse current when the value of the driving current Id is low.

As described above, according to the present embodiment, the speed of switching the laser diode LD between the ON state and the OFF state can be increased for any value of the driving current for the laser diode LD. In particular, when a cathode stem type of laser diode is used as the light emitting element, PMOS transistors, which have poor response, are used as the MOS transistors, and effects of the present invention are exhibited even more significantly. Also, with a light emitting device capable of APC, it is necessary to generate a large driving current in order to compensate the light amount when aging degradation of the laser diode occurs, and the MOS transistor for driving the laser diode needs to be designed having a large size in advance. If the MOS transistor is designed having a large size in this way, a longer time is required for charging and discharging the gate of the transistor when the driving current is small, and the state of the laser diode cannot be switched at high speed. With the present invention, a current that is dependent on the differential value of the voltage is used as the supplementary current, thus making it possible to increase the speed of switching the laser diode LD between the ON state and the OFF state even with a light emitting device that is capable of APC.

Next, another example of a specific circuit configuration for realizing the functional configuration of the driving circuit 100 shown in FIG. 1 will be described with reference to FIG. 4. The supplementary current supply unit 102 and the control unit 103 are different from those in the circuit configuration shown in FIG. 2, and since the other components are similar, the following describes differences from the circuit configuration shown in FIG. 2.

Figure 4:
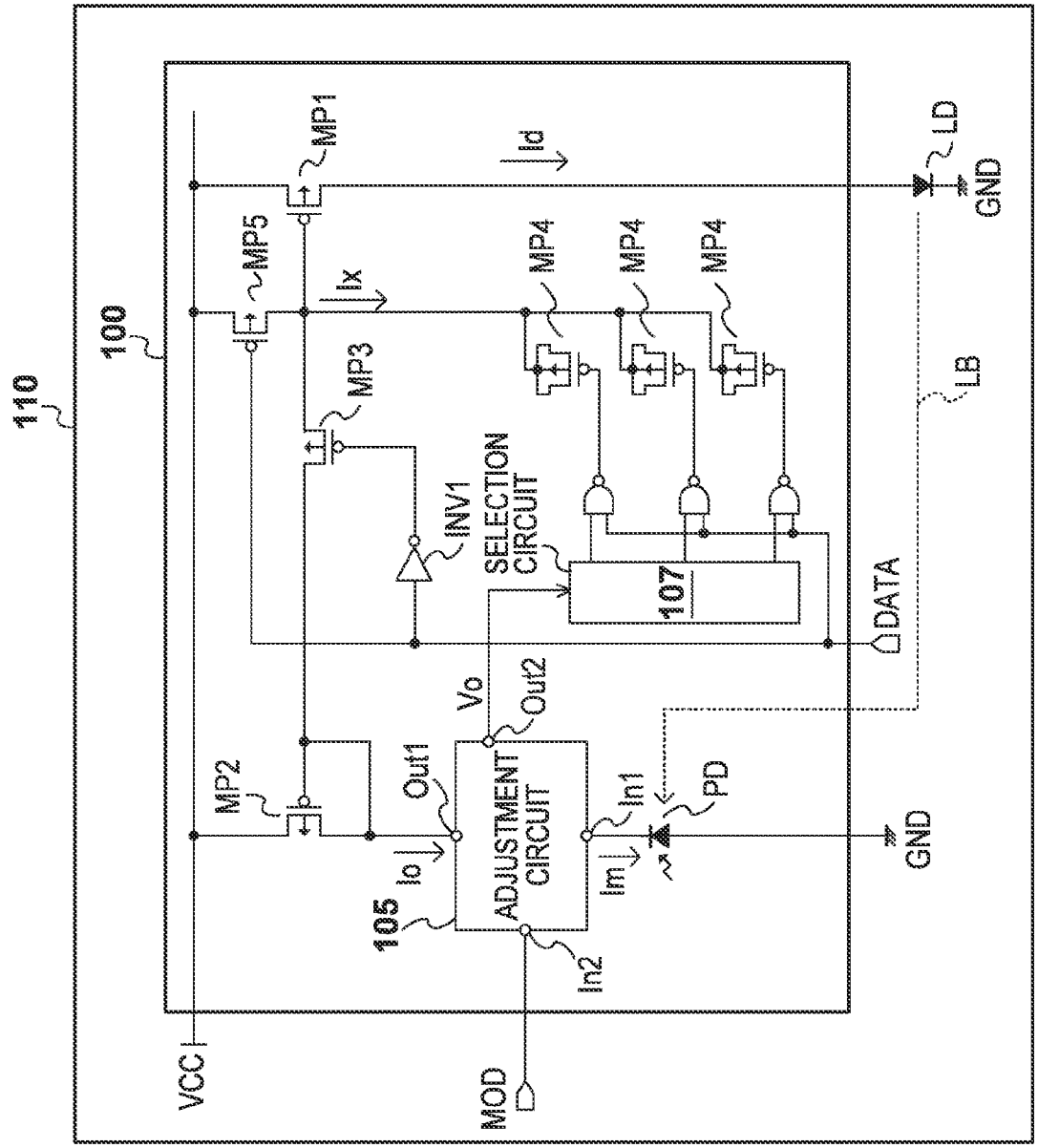
FIG. 4 is a diagram showing another example of the circuit configuration of the light emitting device according to an embodiment of the present invention.

In the embodiment shown in FIG. 4, the supplementary current supply unit 102 can have a selection circuit 107, multiple MOS transistors MP4 (fourth MOS transistors), and multiple NAND circuits that connect the selection circuit 107 to the MOS transistors MP4. The control unit 103 can have the MOS transistor MP3 (third MOS transistor) that functions as the switch SW1 in FIG. 2, and a MOS transistor MP5 (fifth MOS transistor) that functions as the switch SW2 in FIG. 2. The MOS transistor MP4 is a PMOS transistor, for example, but may be an NMOS transistor that has a back gate that is insulated from the semiconductor substrate.

Although the driving circuit 100 in FIG. 4 includes three MOS transistors MP4, it may include one or more of them. Since the three MOS transistors MP4 have similar configurations, the following describes the configuration of one of them. At least one of the source, the drain, and the back gate of the MOS transistor MP4 is connected to the gate of the MOS transistor MP1. The following example takes the case where the source, the drain, and the back gate of the MOS transistor MP4 are all connected to the gate of the MOS transistor MP1. The gate of the MOS transistor MP4 is connected to the output terminal of the corresponding NAND circuit. The input signal DATA is supplied to one of the input terminals of the NAND circuit, and the other input terminal is connected to the selection circuit 107. The voltage Vo is supplied from the adjustment circuit 105 to the selection circuit 107.

The input signal DATA is supplied to the gate of the MOS transistor MP3 via the inverter INV1. The source of the MOS transistor MP3 is connected to the gate of the MOS transistor MP2, the drain is connected to the gate of the MOS transistor MP1, and the back gate is connected to the power-supply voltage VCC. The input signal DATA is supplied to the gate of the MOS transistor MP5, the drain of the MOS transistor MP5 is connected to the gate of the MOS transistor MP1, and the source and the back gate are connected to the power-supply voltage VCC.

Next is a description of an example of operations performed by the light emitting device 110 in FIG. 4. Since the basic operations are similar to the operations described using the timing chart of FIG. 3, the following describes operations performed by the supplementary current supply unit 102 in the data processing mode, which are different from the operations in the timing chart of FIG. 3. When the data processing mode is started, in accordance with the value of the voltage Vo supplied from the adjustment circuit 105, the selection circuit 107 supplies H to one or more of the NAND circuits connected to the selection circuit 107, and supplies L to the remaining NAND circuits. When the input signal DATA at H is supplied to a NAND circuit that has been supplied H from the selection circuit 107, the output of that NAND circuit changes from L to H. Accordingly, the potential of the gate of the MOS transistor MP4 that is connected to that NAND circuit also changes, and the gate of the MOS transistor MP1 is supplied with the supplementary current Ix that corresponds to the capacitance value between the gate of the MOS transistor MP4 and the source, drain, and back gate. Also in the case where the input signal DATA has changed from H to L, the gate of the MOS transistor MP1 is supplied with the driving current Ix from the MOS transistors MP4 that are connected to the NAND circuits that were supplied with H from the selection circuit 107. Regardless of which direction the input signal DATA changes, the supplementary current Ix is dependent on the differential value of the voltage between the gate of the MOS transistor MP4 and the other electrodes, and the supplementary current Ix flows in the direction of promoting change in the gate potential of the MOS transistor MP1, thus obtaining an effect similar to that of the embodiment in FIG. 2.

The number of NAND circuits that are supplied with H by the selection circuit 107 is positively correlated with the value of the voltage Vo. For example, the range of values that the voltage Vo can take is divided into three ranges. If the voltage Vo is included in the lowest range, the selection circuit 107 supplies only one NAND circuit with H. If the voltage Vo is included in the second range, the selection circuit 107 supplies only two NAND circuits with H. If the voltage Vo is included in the highest range, the selection circuit 107 supplies all of the NAND circuits with H. Accordingly, the gate of the MOS transistor MP1 is supplied with the supplementary current Ix that is dependent on the value of the driving current Id in a stepwise manner. The selection circuit 107 may be configured by multiple reference voltages and multiple comparators, or may be configured by an analog-digital converter (A/D converter).

Next, still another example of a specific circuit configuration for realizing the functional configuration of the driving circuit 100 shown in FIG. 1 will be described with reference to FIG. 5. The supplementary current supply unit 102 and the control unit 103 are different from those in the circuit configuration shown in FIG. 4, and since the other components are similar, the following describes differences from the circuit configuration shown in FIG. 4.

Figure 5:
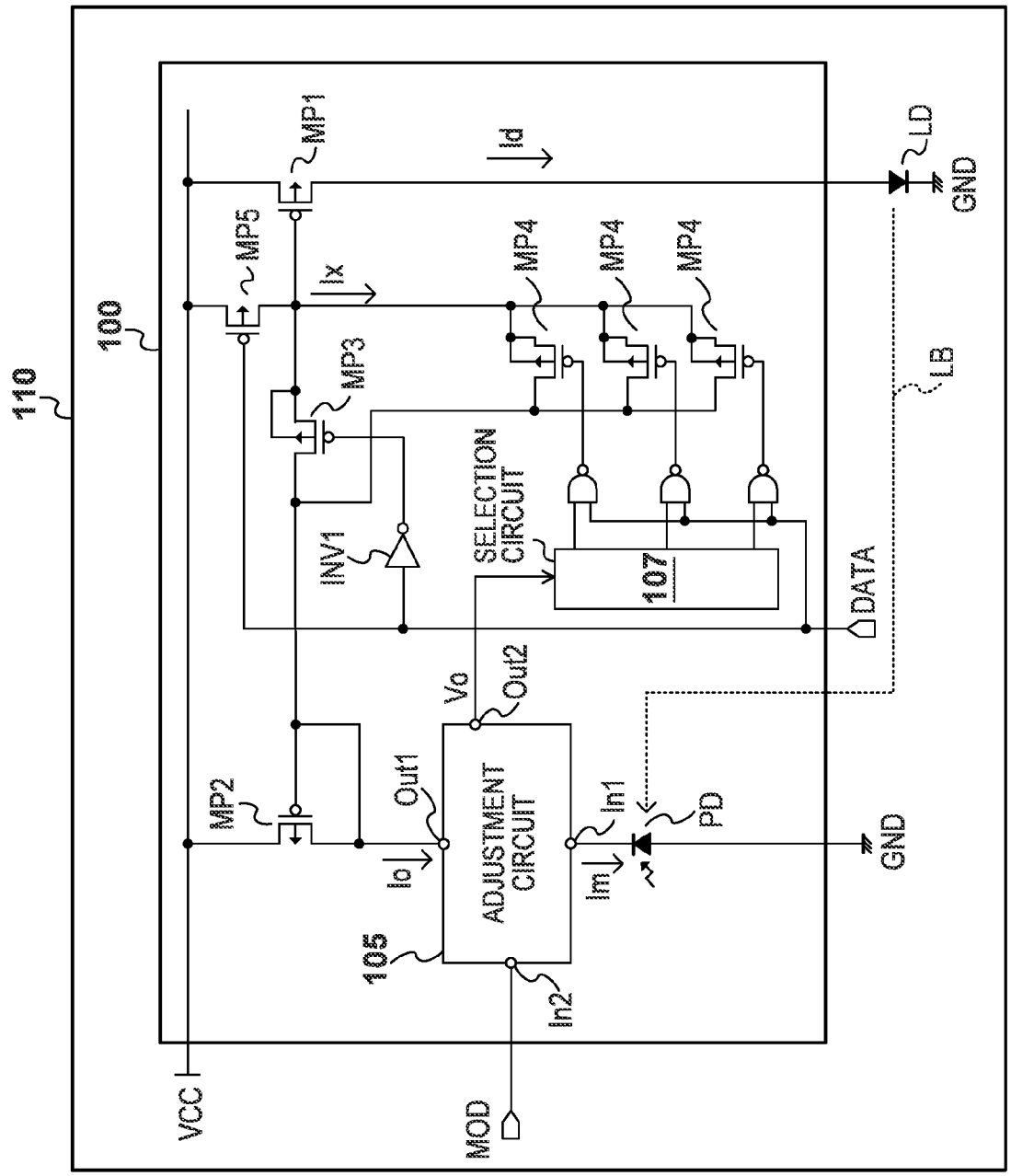
FIG. 5 is a diagram showing still another example of the circuit configuration of the light emitting device according to an embodiment of the present invention.

In the embodiment in FIG. 5, the source and the back gate of each of the MOS transistors MP4 are both connected to the gate of the MOS transistor MP1, and the drain is connected to the gate of the MOS transistor MP2. The gate of each of the MOS transistors MP4 is connected to the output terminal of the corresponding NAND circuit. The input signal DATA is supplied to the gate of the MOS transistor MP3 via the inverter INV1, the source and the back gate of the MOS transistor MP3 are connected to the gate of the MOS transistor MP1, and the drain is connected to the gate of the MOS transistor MP2.

The light emitting device 110 in FIG. 5 operates similarly to the light emitting device 110 in FIG. 4 and obtains similar effects. With the light emitting device 110 in FIG. 5, the back gate of the MOS transistor MP3 is connected to the gate of the MOS transistor MP1. For this reason, the gate of the MOS transistor MP1 is also supplied with a current having a value obtained by the differential value of the voltage between the gate and the back gate of the MOS transistor MP3 being multiplied by the capacitance between the gate and the back gate. Accordingly, the MOS transistor MP3 that functions as a switch for connecting the gates of the MOS transistors MP1 and MP2 that form a current mirror circuit can supply the supplementary current.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-254458, filed Nov. 21, 2011, which is hereby incorporated by reference herein in its entirety.

What is claimed is:

1. A driving circuit that switches a light emitting element between an ON state and an OFF state in synchronization with an input signal, the driving circuit comprising:

a driving current supply unit that has a control terminal and a first MOS transistor for supplying the light emitting element with a driving current whose value changes with dependency on a potential of the control terminal;

a control unit that switches the light emitting element between the ON state and the OFF state by changing the potential of the control terminal in synchronization with the input signal;

a supplementary current supply unit including a variable capacitor, the capacitor having a first electrode that is connected to the control terminal and a second electrode to which a signal based on the input signal is supplied, and an adjustment unit having a photoelectric conversion element and an adjustment circuit, wherein a voltage applied to the second electrode of the capacitor changes in synchronization with the input signal, and a supplementary current is generated by change in the voltage applied to the second electrode of the capacitor, wherein the second electrode of the capacitor is not electrically connected with any of a source of the first MOS transistor and the light emitting element, and wherein the photoelectric conversion element measures a light emission amount of the light emitting element due to the driving current, and the adjustment circuit adjusts, based on the measured light emission amount, the value of the driving current supplied by the driving current supply unit and changes a capacitance value of the capacitor in accordance with the adjusted value of the driving current.

2. The circuit according to claim 1, wherein the driving current supply unit further has a second MOS transistor, and a gate of the first MOS transistor functions as the control terminal, the control unit has a third MOS transistor for connecting the gate of the first MOS transistor and a gate of the second MOS transistor, in a case where the light emitting element is to be switched to the ON state, the control unit connects the gate of the first MOS transistor and the gate of the second MOS transistor so as to form a current mirror circuit, and in a case where the light emitting element is to be switched to the OFF state, the control unit disconnects the gate of the first MOS transistor and the gate of the second MOS transistor such that the current mirror circuit is no longer formed, and in a case where the current mirror circuit is formed, the driving current supply unit supplies a current that is dependent on the current supplied to the second MOS transistor, from the first MOS transistor to the light emitting element as the driving current.

3. The circuit according to claim 2, wherein a back gate of the third MOS transistor is connected to the gate of the first MOS transistor, and the gate potential of the third MOS transistor changes in synchronization with the input signal.

4. The circuit according to claim 2, wherein the third MOS transistor functions as a switch.

5. The circuit according to claim 1, wherein the supplementary current supply unit has a fourth MOS transistor that functions as the capacitor, and the gate potential of the fourth MOS transistor changes in synchronization with the input signal, and the control terminal is supplied with the supplementary current from at least any of a source, a drain, and a back gate of the fourth MOS transistor due to change in the gate potential of the fourth MOS transistor.

6. The circuit according to claim 1, wherein the higher the value of the driving current for causing the measured light emission amount to be the predetermined value, the higher the adjustment circuit raises the capacitance value of the variable capacitor.

7. The circuit according to claim 1, wherein the supplementary current supply unit has a selection circuit and a plurality of fourth MOS transistors that function as the capacitor, the selection circuit changes the gate potential of one or more of the fourth MOS transistors among the plurality of fourth MOS transistors in synchronization with the input signal, and the control terminal is supplied with the supplementary current from at least any of a source, a drain, and a back gate of the one or more fourth MOS transistor due to change in the gate potential of the one or more fourth MOS transistors, and the higher the value of the driving current for causing the measured light emission amount to be the predetermined value, the greater the number of fourth MOS transistors whose gate potential is changed by the selection circuit.

8. The circuit according to claim 1, wherein a current value of the supplementary current in a case where the light emitting element is to be switched to the ON state has a different sign from that in a case where the light emitting element is to be switched to the OFF state.

9. The circuit according to claim 1, wherein when the control unit raises the potential of the control terminal, the supplementary current supply unit supplies the control terminal with the supplementary current having a positive current value, and wherein when the control unit drops the potential of the control terminal, the supplementary current supply unit supplies the control terminal with the supplementary current having a negative current value.

10. The circuit according to claim 1, wherein the input signal is supplied to the driving circuit through a single line.

11. A light emitting device comprising:
a light emitting element; and
a driving circuit that switches the light emitting element between an ON state and an OFF state in synchronization with an input signal, the driving circuit comprising:

a driving current supply unit that has a control terminal and a first MOS transistor for supplying the light emitting element with a driving current whose value changes with dependency on a potential of the control terminal;

a control unit that switches the light emitting element between the ON state and the OFF state by changing the potential of the control terminal in synchronization with the input signal;

a supplementary current supply unit including a variable capacitor, the capacitor having a first electrode that is connected to the control terminal and a second electrode to which a signal based on the input signal is supplied, and an adjustment unit having a photoelectric conversion element and an adjustment circuit, wherein a voltage applied to the second electrode of the capacitor changes in synchronization with the input signal, and a supplementary current is generated by change in the voltage applied to the second electrode of the capacitor, wherein the second electrode of the capacitor is not electrically connected with any of a source of the first MOS transistor and the light emitting element, and wherein the photoelectric conversion element measures a light emission amount of the light emitting element due to the driving current, and the adjustment circuit adjusts, based on the measured light emission amount, the value of the driving current supplied by the driving current supply unit and changes a capacitance value of the capacitor in accordance with the adjusted value of the driving current.

12. A driving circuit that switches a light emitting element between an ON state and an OFF state in synchronization with an input signal, the driving circuit comprising:
a driving current supply unit that has a control terminal and a first MOS transistor for supplying the light emitting element with a driving current whose value changes with dependency on a potential of the control terminal;
a control unit that switches the light emitting element between the ON state and the OFF state by changing the potential of the control terminal in synchronization with the input signal;
a supplementary current supply unit including a variable capacitor, the capacitor having a first electrode that a power-supply voltage is supplied to and a second electrode to which a signal based on the input signal is supplied, and
an adjustment unit having a photoelectric conversion element and an adjustment circuit,
wherein a voltage applied to the second electrode of the capacitor changes in synchronization with the input signal, and a supplementary current is generated by change in the voltage applied to the second electrode of the capacitor,
wherein the second electrode of the capacitor is not electrically connected with any of a source of the first MOS transistor and the light emitting element, and
wherein the photoelectric conversion element measures a light emission amount of the light emitting element due to the driving current, and the adjustment circuit adjusts, based on the measured light emission amount, the value of the driving current supplied by the driving current supply unit and changes a capacitance value of the capacitor in accordance with the adjusted value of the driving current.

13. A light emitting device comprising:
a light emitting element; and
a driving circuit that switches the light emitting element between an ON state and an OFF state in synchronization with an input signal, the driving circuit comprising:
a driving current supply unit that has a control terminal and a first MOS transistor for supplying the light emitting element with a driving current whose value changes with dependency on a potential of the control terminal;
a control unit that switches the light emitting element between the ON state and the OFF state by changing the potential of the control terminal in synchronization with the input signal;
a supplementary current supply unit including a variable capacitor, the capacitor having a first electrode that a power-supply voltage is supplied to and a second electrode to which a signal based on the input signal is supplied, and
an adjustment unit having a photoelectric conversion element and an adjustment circuit,
wherein a voltage applied to the second electrode of the capacitor changes in synchronization with the input signal, and a supplementary current is generated by change in the voltage applied to the second electrode of the capacitor,
wherein the second electrode of the capacitor is not electrically connected with any of a source of the first MOS transistor and the light emitting element, and
wherein the photoelectric conversion element measures a light emission amount of the light emitting element due to the driving current, and the adjustment circuit adjusts, based on the measured light emission amount, the value of the driving current supplied by the driving current supply unit and changes a capacitance value of the capacitor in accordance with the adjusted value of the driving current.

* * * * *